(12) United States Patent
Sakai et al.

(10) Patent No.: US 8,363,885 B2
(45) Date of Patent: Jan. 29, 2013

(54) METHOD, DEVICE, AND PROGRAM FOR EMBEDDING, DISPLAYING, AND RECOGNIZING DATA

(75) Inventors: Kenichiro Sakai, Kawasaki (JP); Hirotaka Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 960 days.

(21) Appl. No.: 12/367,221

(22) Filed: Feb. 6, 2009

(65) Prior Publication Data

US 2009/0196458 A1  Aug. 6, 2009

(30) Foreign Application Priority Data

Feb. 4, 2008 (JP) ................... 2008-023497

(51) Int. Cl.
*G06K 9/00* (2006.01)
(52) U.S. Cl. .......................... 382/100; 380/28
(58) Field of Classification Search .................. None
See application file for complete search history.

(56) References Cited

U.S. PATENT DOCUMENTS

| | | | |
|---|---|---|---|
| 7,571,487 B2 * | 8/2009 | Shibata | 726/26 |
| 7,961,871 B2 * | 6/2011 | Okubo et al. | 380/28 |
| 2004/0234139 A1 | 11/2004 | Moroo et al. | |
| 2004/0255123 A1 * | 12/2004 | Noyama et al. | 713/176 |
| 2007/0237326 A1 * | 10/2007 | Nonaka et al. | 380/37 |

FOREIGN PATENT DOCUMENTS

| | | |
|---|---|---|
| JP | 2000-350002 | 12/2000 |
| JP | 2004-260639 | 9/2004 |
| JP | 2004-328090 | 11/2004 |
| JP | 2004-349879 | 12/2004 |
| JP | 2005-176287 | 6/2005 |
| JP | 2006-50043 | 2/2006 |
| JP | 2006050043 | * 2/2006 |
| JP | 2007-88801 | 4/2007 |

OTHER PUBLICATIONS

Japanese Notice of Rejection Ground mailed Dec. 6, 2011 issued in corresponding Japanese Patent Application No. 2008-023497.

* cited by examiner

*Primary Examiner* — Chan S Park
*Assistant Examiner* — Nancy Bitar
(74) *Attorney, Agent, or Firm* — Staas & Halsey LLP

(57) ABSTRACT

First, the original data C is divided into an n number of pieces of partial data C1-Cn. Then pieces of position information P1-Pn are added to those pieces of divided partial data, and they are respectively embedded into the n number of duplicated images. Then, the resultant images E1-En are produced. The resultant images are displayed in the same position on a display screen as a still image for T1 seconds each. In a camera of a mobile phone, etc., the displayed images are repeatedly photographed at an interval of T2 seconds that is shorter than T1 seconds, and the pieces partial data C1-Cn and position information P1-Pn are sequentially extracted. When all the processes are completed, the pieces of partial data are integrated on the basis of the pieces of position information P1-Pn. As a result, the original data is obtained.

15 Claims, 20 Drawing Sheets

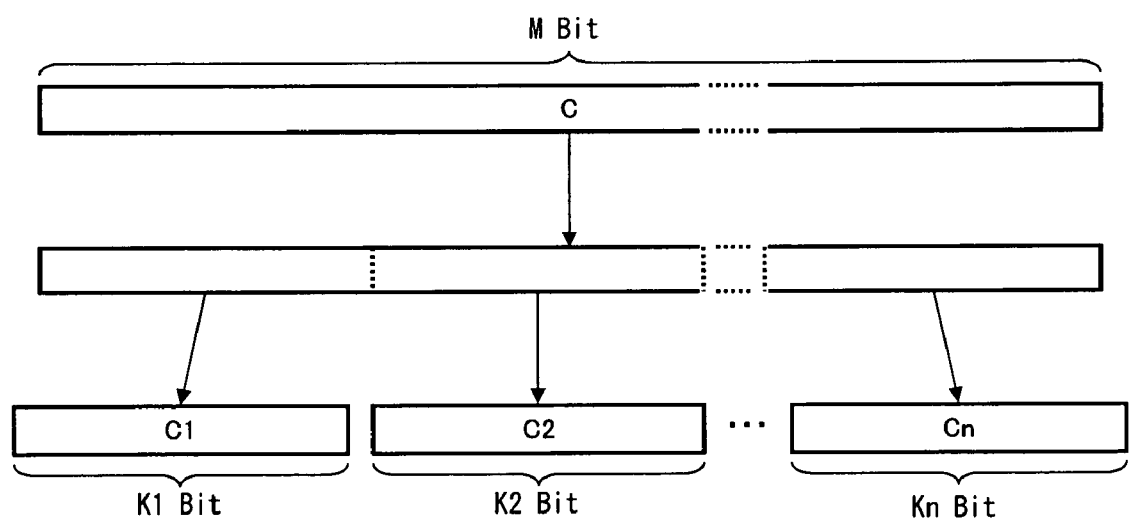
F I G. 3

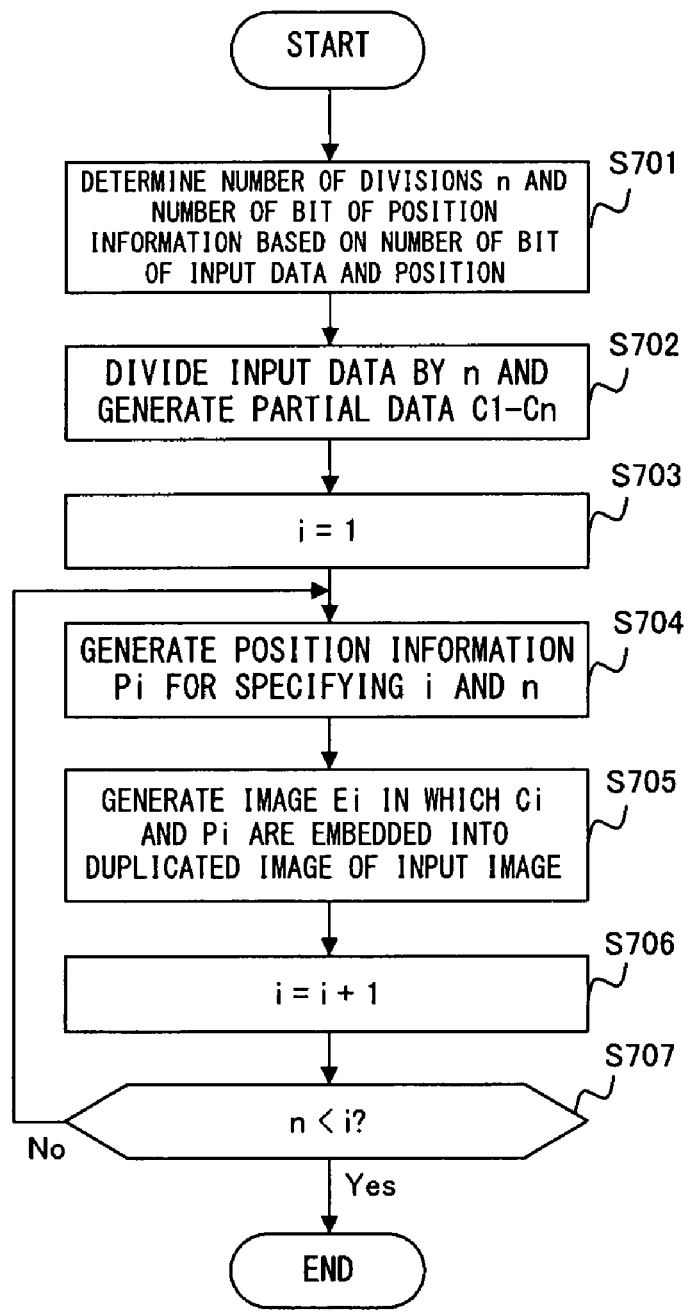
F I G. 7

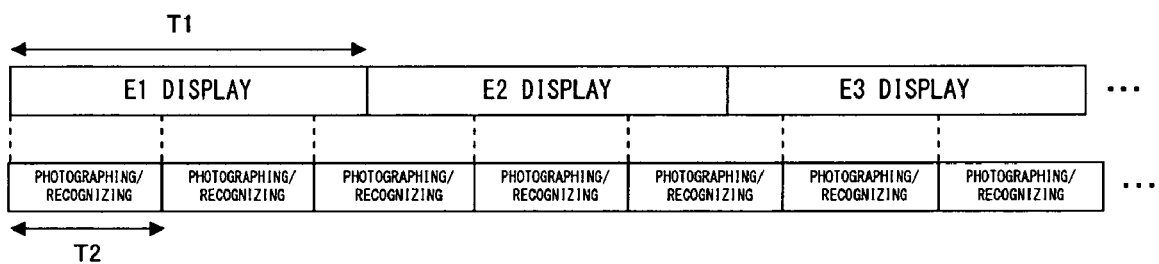
F I G. 1 0

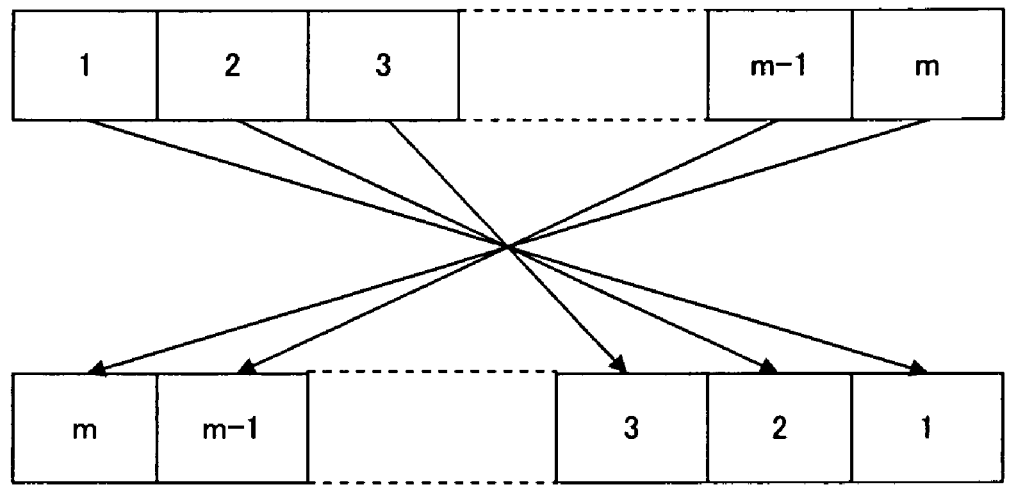
F I G. 1 4 A
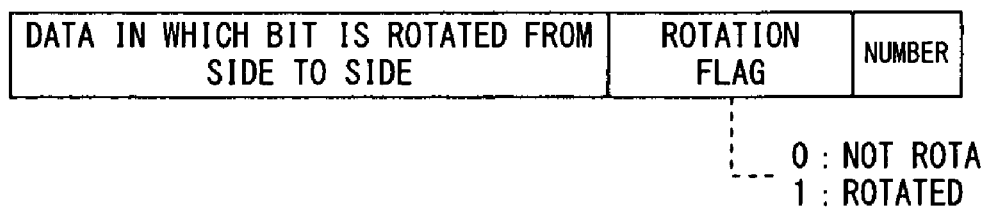
F I G. 1 4 B

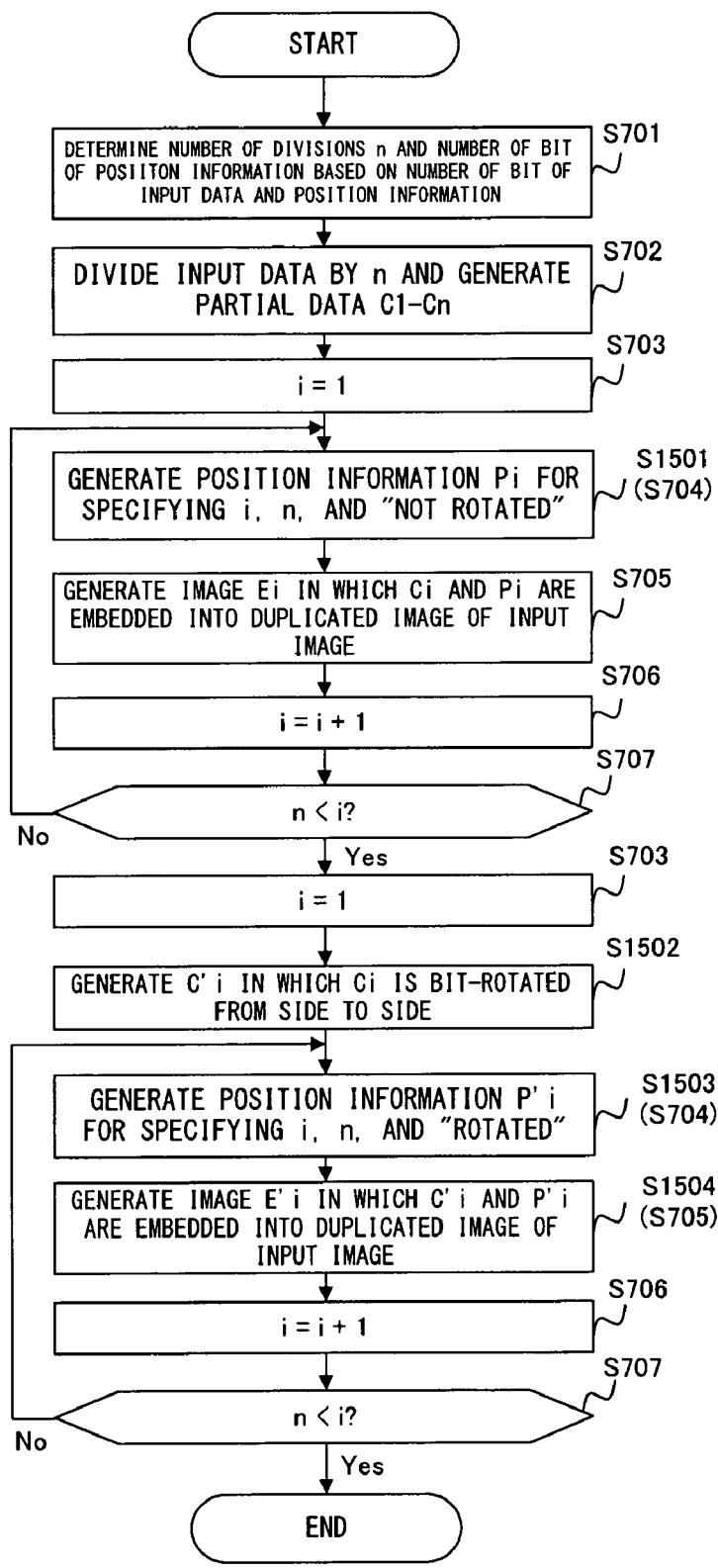
F I G. 1 5

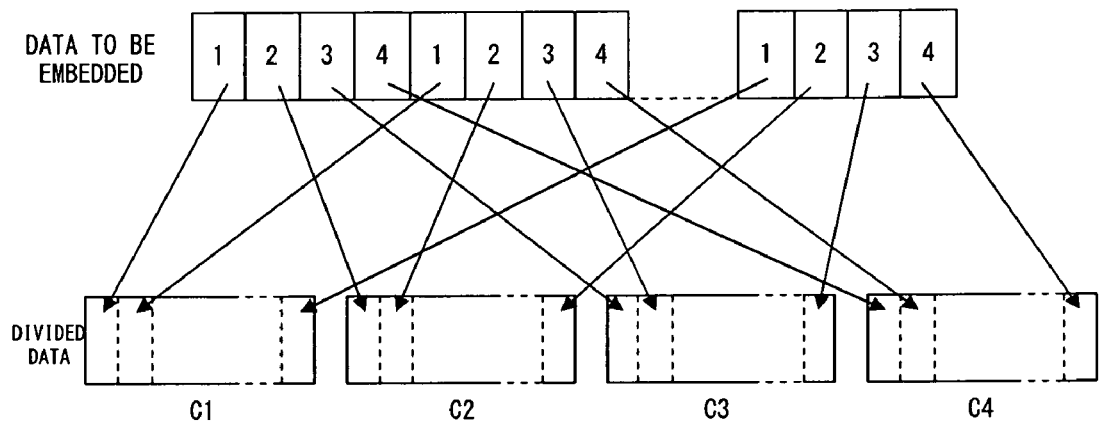
F I G. 17A
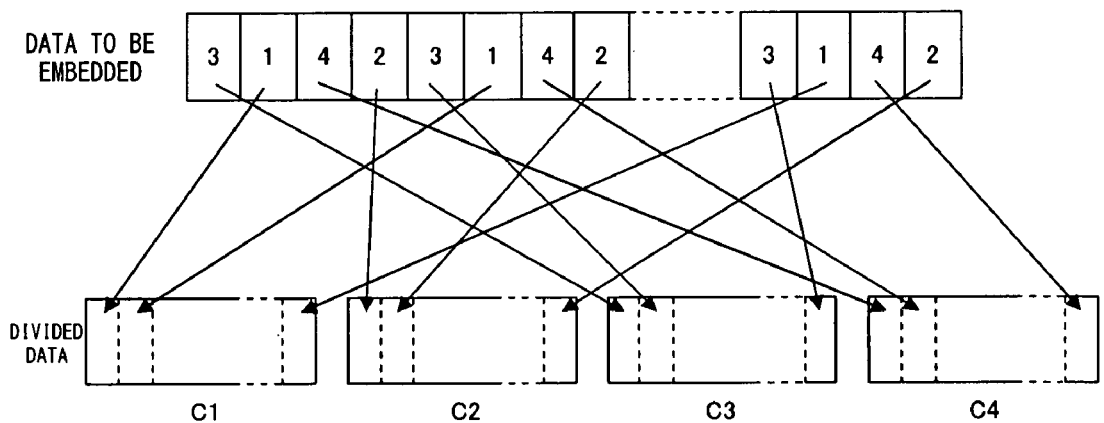
F I G. 17B

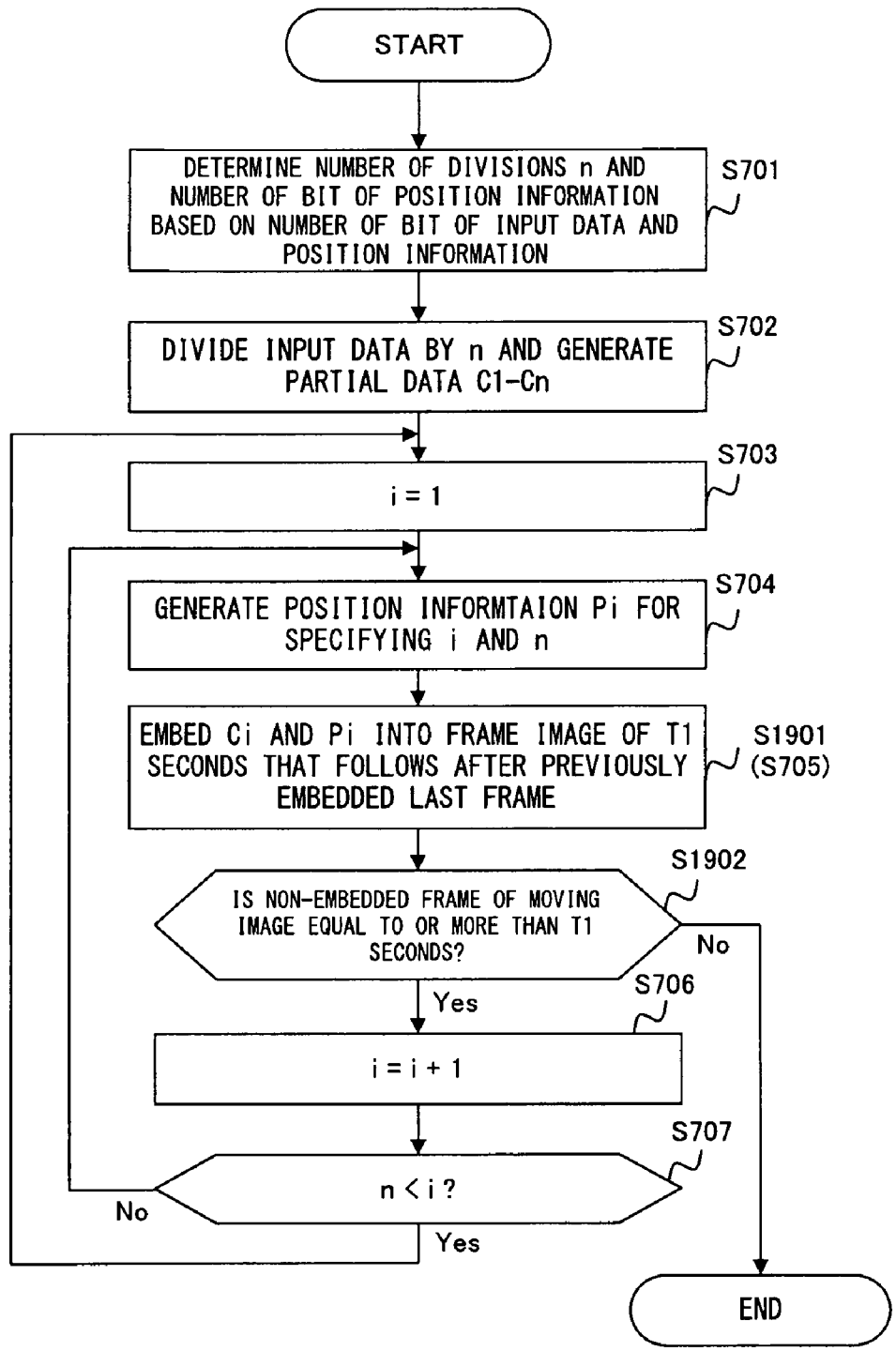
F I G. 19

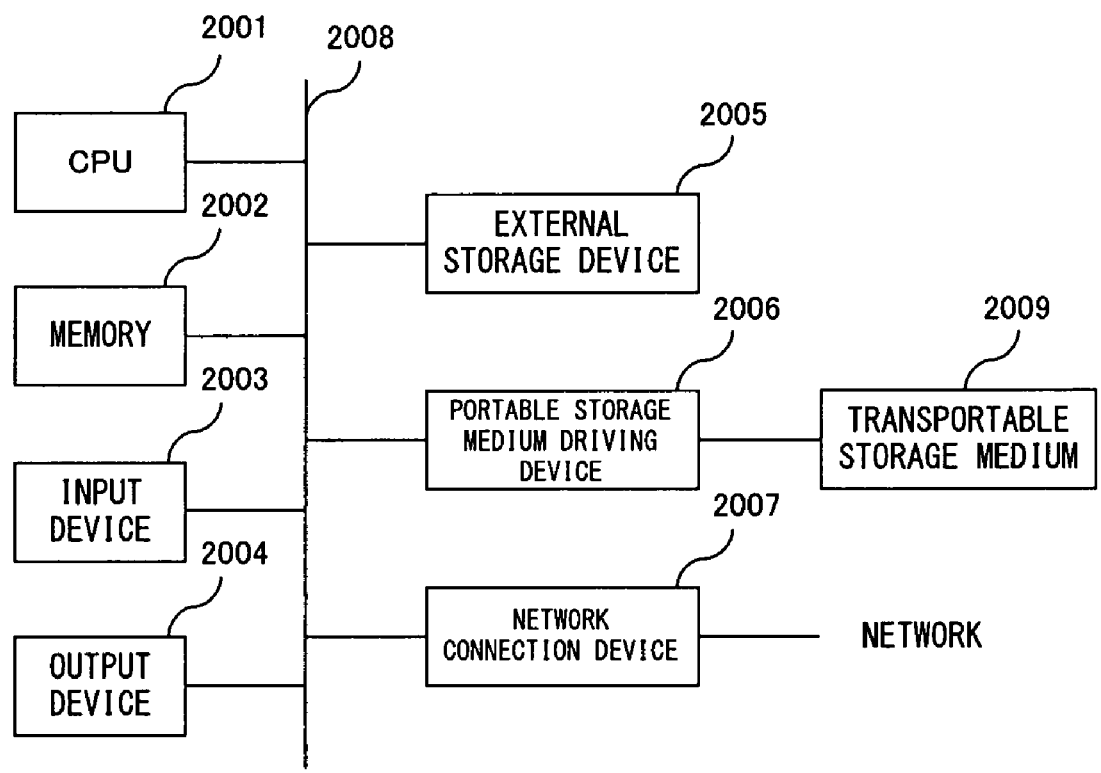
F I G. 20

METHOD, DEVICE, AND PROGRAM FOR EMBEDDING, DISPLAYING, AND RECOGNIZING DATA

BACKGROUND OF THE INVENTION

1. Field of the Invention

The present invention relates to a technique of displaying on a display, photographing, and recognizing an image into which data is embedded in such a way that the embedded data cannot easily be seen by human eyes.

2. Description of the Related Art

As a conventional technique of embedding data into an image in such a way that it cannot easily be seen by human eyes, the technique disclosed in Patent Document 1 is known.

In this conventional technique, a yellow component of an original image is divided into blocks of a predetermined size, and the data to which error correction data is added is repeatedly embedded into a pair of blocks on the basis of a magnitude relation of the difference in average density of adjacent blocks of the block pair.

Data acquisition from the image in which data is embedded can be realized by, firstly, obtaining the data that is repeatedly embedded on the basis of a magnitude relation of the average density of adjacent blocks of the block pair (original data to which error correction data is added), and then by performing majority decision and error correction. Performing majority decision allows the number of errors in the data to be reduced, and performing error correction allows the original data to be obtained with errors in the data corrected.

As majority decision and error correction enable to obtain accurate data, embedded data can also be obtained from images captured by image input means such as a camera, with the image containing embedded data being printed on a piece of paper or displayed on a screen.

[Patent Document 1] Japanese Patent Application Publication No. 2004-349879

However, an image obtained via image output means such as print or a display and image input means such as a camera is deteriorated from the original image. Therefore, in the above-mentioned conventional data embedding method, processes such as providing data for error correction or repeatedly embedding the same data are required in order to obtain data correctly from the images. Thus there has been a problem whereby the amount of data that is actually embeddable is limited, and this amount has been difficult to increase.

SUMMARY OF THE INVENTION

An object of the present invention is to allow a far larger amount of data to be embedded than is allowed by the conventional method in an application of displaying an image containing embedded data on a display. Hereinafter, the image containing embedded data referred to as a 'resultant image.'

A first embodiment of the present invention is for providing a method, device, or a program for displaying on a display an image into which data is embedded.

In the data dividing step, subject data to be embedded is divided by a predetermined length into a plural number of pieces of partial data. Hereinafter, the number of pieces of partial data is referred to as a 'divided number'. In this step, for example, the subject data to be embedded is cut by a predetermined length, and each of the pieces of cut data is output as pieces of partial data. Also, in this step the subject data to be embedded is, for example, cut by a predetermined length, a predetermined reversible data converting operation is performed for each piece of the cut data, and each pieces of resulting converted data are output as the pieces of partial data. Also, in this step the pieces of partial data are, for example, generated so that each piece of cut data is redundantly included in the pieces of partial data.

In the data embedding step, the pieces of divided partial data, together with pieces of position information for specifying divided positions, are for example embedded into a plurality of input images, and the divided numbers of resultant images are generated. When this happens, a plurality of the input images are identical to each other obtained by duplicating one still input image. Also, a plurality of the input images are a plurality of frame images composing an input moving image.

A second embodiment of the present invention is for providing a method, device, or a program for extracting the pieces of partial data from a display image displayed by the method according to the second embodiment of the present invention, and for restoring the subject image to be embedded.

In the image inputting step, the display images are photographed at predetermined photographing time intervals.

In the data extracting step, the pieces of embedded partial data and position information are extracted from the photographed images.

In the data integrating step, the pieces of partial data extracted on the basis of the pieces of extracted position information are integrated to restore the subject data to be embedded after repeatedly performing the image inputting step and the data extracting step until the pieces of partial data and position information are all obtained, while identifying the pieces of extracted position information. When this happens, the pieces of position information include, for example, at least information relating to the integrating order of the pieces of partial data. And in the data integrating step, by identifying integrating order indicated by the pieces of position information, it is determined that extraction of all the pieces of partial data is completed when a predetermined number of pieces of partial data of a different integrating order are extracted, and the pieces of partial data are integrated on the basis of the integrating order. Also, the pieces of position information include at least information relating to the number of divisions and the integrating order of the pieces of partial data, and the data integrating step determines, by identifying the number of divisions and the integrating order indicated by the pieces of position information, that extraction of all the pieces of partial data is completed when pieces of partial data of a different integrating order equal in number to the number of divisions are extracted, and integrates the plurality of pieces of partial data on the basis of the integrating order. Also, the pieces of position information include information at least relating to an integrating order of a plurality of pieces of partial data, and a piece of position information of a piece of partial data in which is at the top of the integrating order further includes information relating to the divided number; and the data integrating step determines, by identifying the number of divisions and the integrating order indicated by the pieces of position information, that extraction of all the pieces of partial data is completed when the pieces of partial data of a different integrating order equal in number to the number of divisions are extracted, and integrates the pieces of partial data on the basis of the integrating order.

In the second embodiments of the present invention, the photographing time interval can be configured to be shorter than the display time interval.

According to the present invention, the amount of data that can be embedded can be increased by many times without increasing the display region of an image when photographing/recognizing the image in which data is embedded, even though the same type of image as in the conventional art is used.

Conventionally, the data embeddable in one image is in the tens of bits or about 10 digits. However, in the present invention, larger pieces of data such as a mail address or a URL can be embedded into a display image, and thus it will be possible to provide various kinds of data with using the display image.

According to the present invention, the concealment of data can be increased by performing a reversible converting operation for the data embedded in an image.

According to the present invention, it will be possible to embed the data into successive frames of a moving image, and thus various kinds of data can be provided in the moving image.

BRIEF DESCRIPTION OF THE DRAWINGS

FIG. 3 is an explanatory diagram of a data dividing model in accordance with a first embodiment of the present invention.

FIG. 7 is an operational flowchart of a data embedding process in accordance with a first embodiment of the present invention.

FIG. 10 is an explanatory diagram of display intervals and photographing/recognizing intervals.

FIGS. 14A and 14B are an explanatory diagram and a data configuration diagram of a data embedding method of bit-rotating the pieces of divided data from side to side in accordance with a second embodiment of the present invention.

FIG. 15 is an operational flowchart (2) of a data embedding process in accordance with a second embodiment of the present invention.

FIGS. 17A and 17B are an explanatory diagram of other dividing methods of the pieces of divided data in accordance with a second embodiment of the present invention.

FIG. 19 is an operational flowchart of a data embedding process in accordance with a third embodiment of the present invention.

FIG. 20 shows a hardware configuration example of a computer or terminal device etc. capable of implementing a system that corresponds to first through third embodiments of the present invention.

DESCRIPTION OF THE PREFERRED EMBODIMENTS

Embodiments of the present invention will now be described in detail with reference to the accompanying drawings. Here, in the first through third embodiments of the present invention, original data to be embedded can be embedded in such a way that the embedded data cannot easily be seen by human eyes.

Configuration Diagrams Common to the Embodiments of the Present Invention

Figure 1:
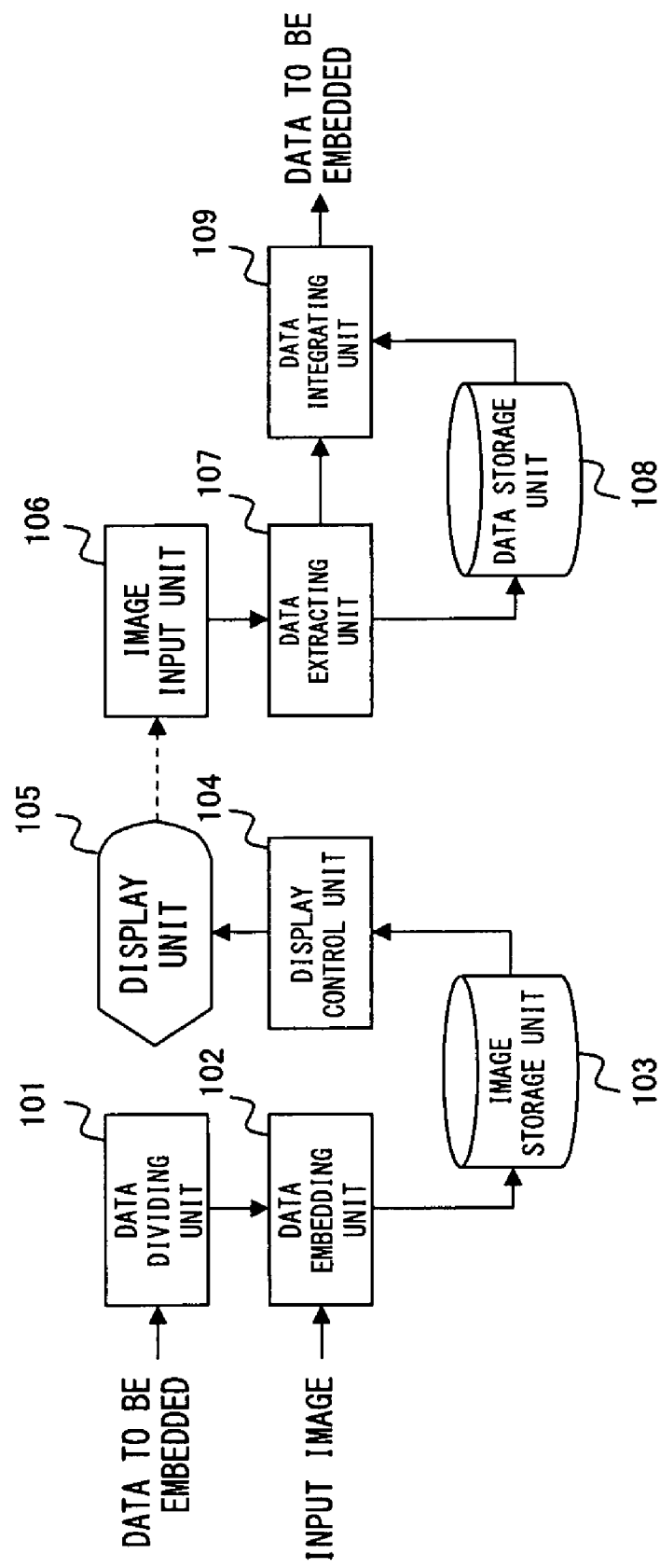
FIG. 1 shows a functional block diagram common to first, second, and third embodiments of the present invention.

FIG. 1 shows a functional block diagram common to first through third embodiments of the present invention.

The data to be embedded is input into a data dividing unit 101, and the n number of pieces of partial data and position information divided therein are output to a data embedding unit 102.

The data embedding unit 102 sequentially embeds the pieces of partial data and position information input from the data dividing unit 101 into input images, and outputs the n number of resultant images to an image storage unit 103 to store those resultant images therein.

A display control unit 104 repeatedly reads out the n number of the resultant images stored in the image storage unit 103 in a predetermined order, and respectively displays the read out images on a display unit 105 for T1 seconds each.

An image input unit 106 photographs the resultant images displayed on the display unit 105 at intervals of T2 seconds, and outputs the photographed images to a data extracting unit 107.

The data extracting unit 107 decodes the photographed images input by the image input unit 106, extracts the pieces of partial data and position information, and stores both the pieces of partial data and the position information in a data storage unit 108. When all the pieces of partial data and position information have been decoded, a data integrating unit 109 is notified that the decoding is complete.

The data integrating unit 109 reads out the pieces of partial data and position information stored in the data storage unit 108, and integrates the read out pieces of partial data and position information into the original data to be embedded in order to output the embedded data.

First Embodiment of the Present Invention

Operations of a first embodiment of the present invention, based on a configuration shown in FIG. 1, will now be described.

Figure 2:
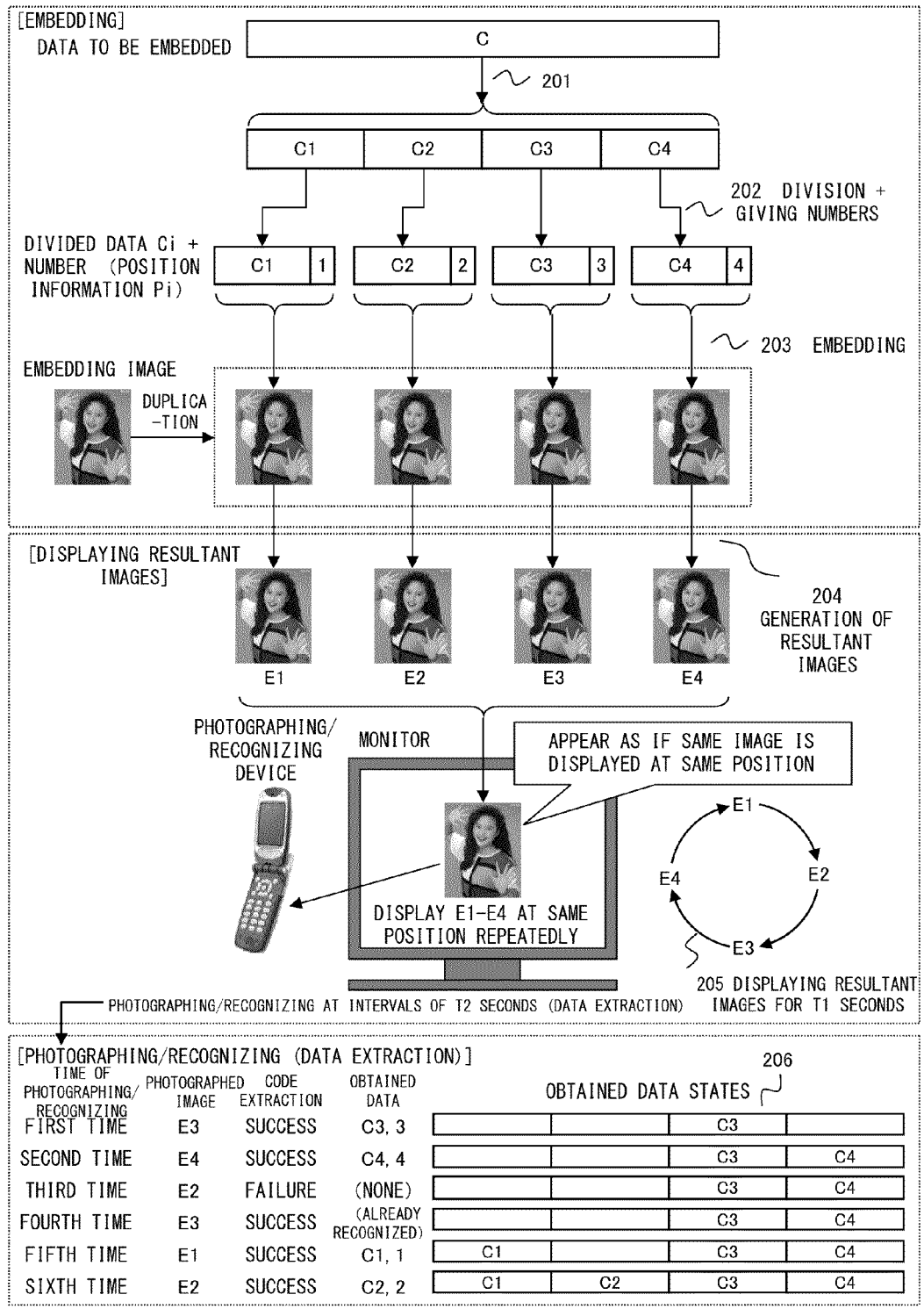
FIG. 2 shows an operating principle of a first embodiment of the present invention.

FIG. 2 shows operating principles of the first embodiment of the present invention.

Firstly, the data dividing unit 101 of FIG. 1 divides original data to be embedded C into the n number of pieces of partial data C1-Cn (n is an integer equal to or more than two; n=4 in FIG. 2), as indicated by 201 in FIG. 2.

Next, the data embedding unit 102 of FIG. 1 respectively adds pieces of position information P1-Pn to the pieces of partial data C1-Cn obtained in the division, as indicated by 202 in FIG. 2.

Further, the data embedding unit 102 duplicates the n number of embedding target images, and respectively embeds the pieces of partial data C1-Cn as well as the pieces of position information P1-Pn that specify the positions of those pieces of partial data into the duplicated images, as indicated by 203 in FIG. 2.

The pieces partial data are set to sizes that can be embedded into the images together with the pieces of position information.

Consequently, the data embedding unit 102 generates the n number of resultant images E1-En in which different pieces of partial data and position information are embedded into the same image, and stores the images into the image storage unit 103 of FIG. 1, as indicated by 204 in FIG. 2.

Next, the display control unit 104 of FIG. 1 sequentially reads out, from the image storage unit 103, the n number of resultant images E1-En in which the pieces of partial data are embedded, and respectively displays the read out images at the same position in the display unit 105 of FIG. 1 for T1 seconds, as indicated by 205 in FIG. 2. Accordingly, it appears as if one still image is displayed at a predetermined position. However, in fact, the n number of images E1-En in which the pieces of partial data are embedded into the same duplicated image are being displayed sequentially for T1 seconds each.

On the other hand, the image input unit 106, data extracting unit 107, data storage unit 108, and data integrating unit 109, all of which are integrated into mobile phones etc., perform the following operations.

Firstly, the image input unit 106 photographs the resultant images displayed on the display unit 105 as described above at intervals of T2 seconds.

Next, the data extracting unit 107 sequentially extracts the pieces of partial data C1-Cn and position information P1-Pn that correspond to each of the pieces of partial data embedded into the above mentioned photographed resultant images, and stores the extracted pieces of data into the data storage unit 108.

In this case, as indicated by 206 in FIG. 2, images E1-E4 are sequentially photographed at intervals of T2 seconds, and for each sequence, pieces of partial data are gradually obtained, varying between success and failure in obtaining the embedded pieces of partial data C1-Cn.

Consequently, if, for example, the number of divisions n is a value fixed in advance, the data extracting unit 107 provides notification to the data integrating unit 109 when it is recognized that the n number of pieces of partial data C1-Cn are all obtained.

The data integrating unit 109 integrates the pieces of partial data on the basis of the pieces of partial data C1-Cn stored in the storage unit 108 and the pieces of position information P1-Pn stored together with the partial data C1-Cn in order to obtain the original data to be embedded and output the obtained original data.

FIG. 3 is an explanatory diagram of a data dividing method that is performed at the data dividing unit 101, in accordance with the first embodiment of the present invention.

The original data of M bits is divided into the n number of pieces of partial data C1-Cn of K1-Kn bits. M is equal to the total of K1 to Kn.

The number of bits K1-Kn of the divided pieces of partial data needs to be determined so that the partial data are embeddable into the image together with the pieces of position information that are embedded with the pieces of partial data. Assuming that the number of bits embeddable into the images is P, and that the number of bits of the pieces of position information P1-Pn that correspond to the pieces of partial data C1-Cn are respectively S1-Sn, Ki and Si need to be determined so that Formula 1 with respect to the i order of the pieces of partial data and position information ($1 \leq i < n$) below is satisfied.

$$Ki + Si \leq P \qquad \text{[Formula 1]}$$

Figure 4:
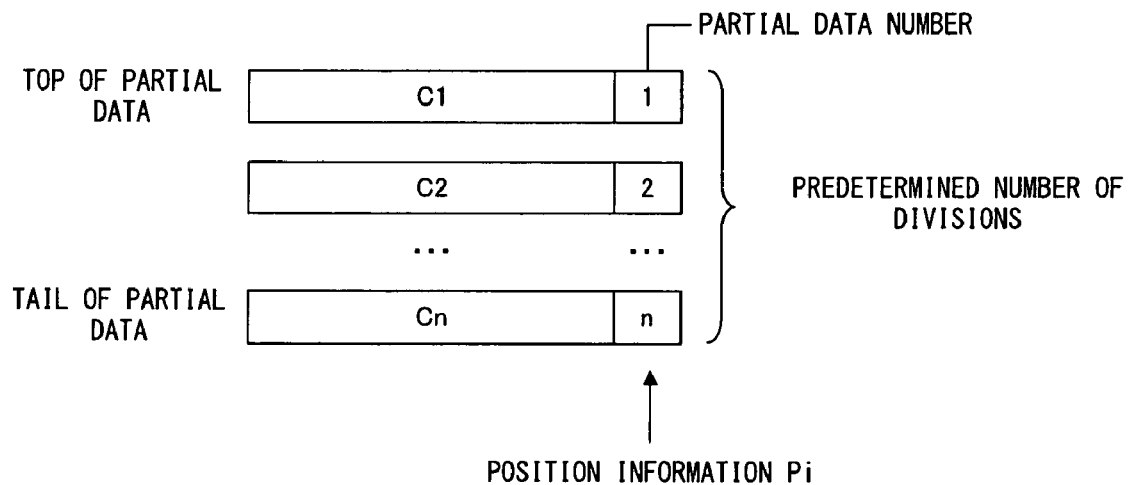
FIG. 4 shows a first configuration example of pieces of partial data C1-Cn and position information P1-Pn in accordance with a first embodiment of the present invention.

FIG. 4 shows a first configuration example of the pieces of partial data C1-Cn and position information P1-Pn in accordance with the first embodiment of the present invention.

In this configuration example, the original data is divided into the pieces of partial data C1-Cn, each of whose amounts is the same, and partial data numbers "1"-"n" are used as the pieces of position information P1-Pn.

Assuming that the number of divisions is n, the number of bits S required for the pieces of position information (divided data number) is determined by means of Formula 2 below.

$$S = \text{ceil}(\log 2(n)) \qquad \text{[Formula 2]}$$

The number of bits K of the pieces of partial data is determined by means of Formula 3 below.

$$K = P - S \qquad \text{[Formula 3]}$$

The maximum embeddable number of bits M is determined by means of Formula 4 below.

$$M = K \times n = (P - \text{ceil}(\log 2(n))) \times n \qquad \text{[Formula 4]}$$

In Formula 2 and Formula 4, ceil( ) means a process of making the number within the parentheses an integer by rounding up the fractional portion of the number, and log 2( ) means a process of calculating a logarithm with the base of 2 of the number within the parentheses.

Assuming that n is 4 (n=4) and P is 100 bits (P=100), then S is 2 (S=2), K is 98 (K=98), and M is 392 (M=392).

Figure 5:
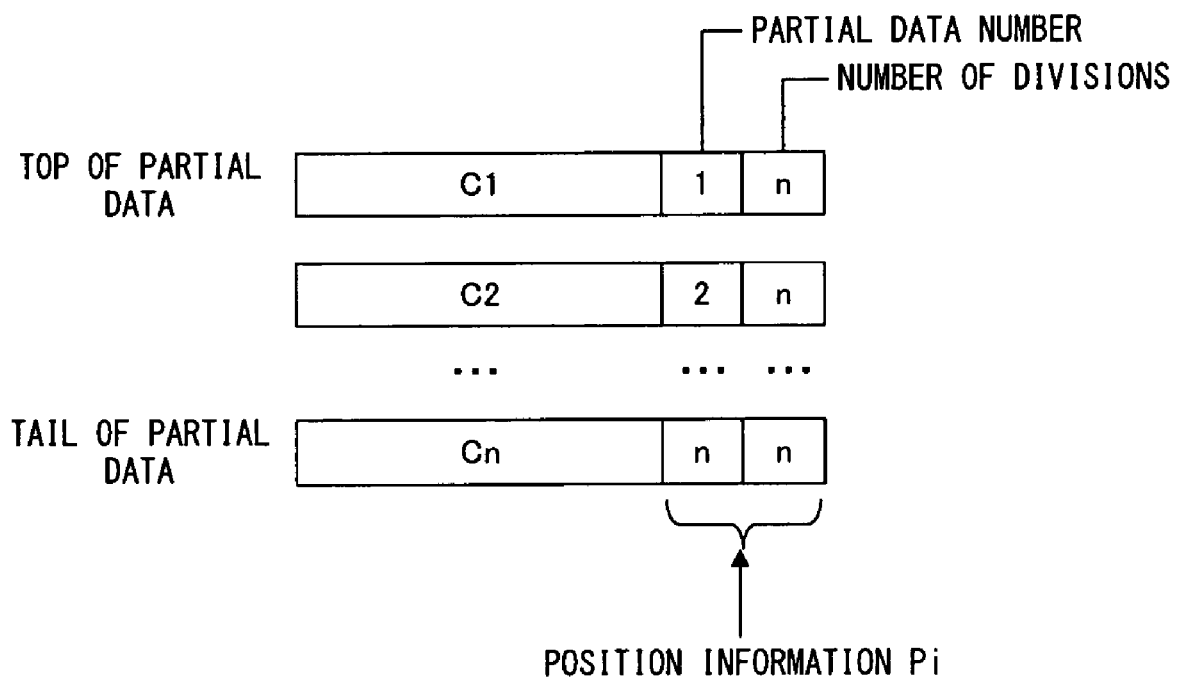
FIG. 5 shows a second configuration example of pieces of partial data C1-Cn and position information P1-Pn in accordance with a first embodiment of the present invention.

FIG. 5 shows a second configuration example of the pieces of partial data C1-Cn and position information P1-Pn in accordance with the first embodiment of the present invention.

In this configuration example, the original data is divided into the pieces of partial data C1-Cn, each of whose size is the same, and the partial data numbers and the number of divisions are used as the pieces of position information P1-Pn.

Assuming that the number of divisions is n, the number of bits S required for the pieces of position information (partial data numbers and the number of divisions) is determined by means of Formula 5 below.

$$S = \text{ceil}(\log 2(n)) \times 2 \qquad \text{[Formula 5]}$$

The number of bits K of the pieces of partial data is determined by means of the above-mentioned formula 3, and the maximum embeddable number of bits M of the data is determined by means of Formula 6 below.

$$M = K \times n = (P - \text{ceil}(\log 2(n)) \times 2) \times n \qquad \text{[Formula 6]}$$

Assuming that n is 4 (n=4) and P is 100 bits (P=100), then S is 4 (S=4), K is 96 (K=96), and M is 384 (M=384).

Figure 6:
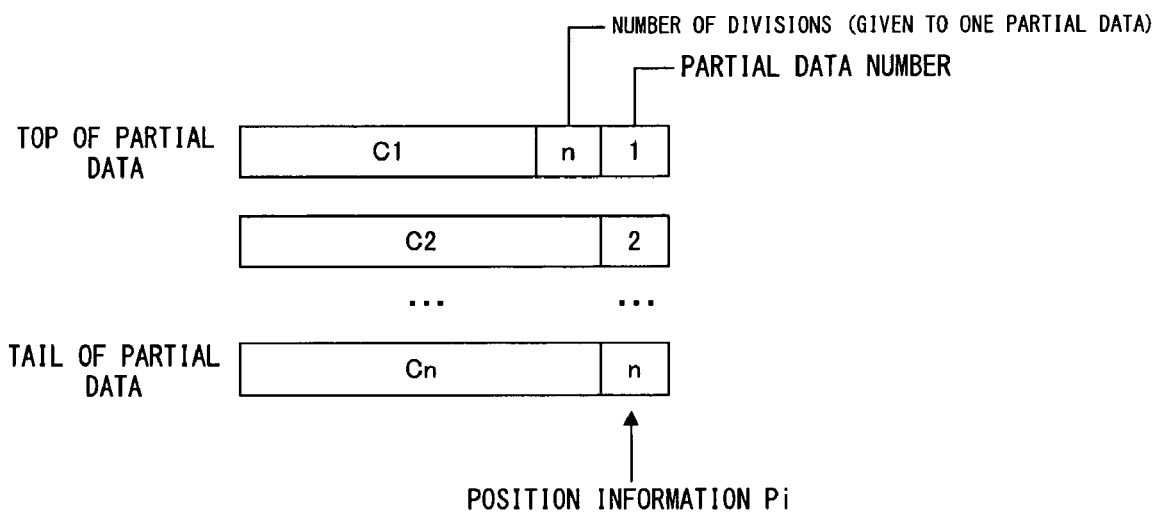
FIG. 6 shows a third configuration example of pieces of partial data C1-Cn and position information P1-Pn in accordance with a first embodiment of the present invention.

FIG. 6 shows a third configuration example of the pieces of partial data C1-Cn and position information P1-Pn, in accordance with the first embodiment of the present invention.

In this configuration example, the original data is divided into the pieces of partial data C2-Cn, each of whose size is the same except for the top piece of partial data C1. The partial data number and the number of divisions are set to the top piece of partial data C1 as pieces of position information P1, and only the partial data numbers are set to the other pieces of partial data C2-Cn, excluding the top piece of partial data as the pieces of position information Pi.

Assuming that the number of divisions is n, the number of bits S1 required for the piece of position information P1 of the top piece of partial data C1 (partial data number and the number of divisions) is determined by means of Formula 7 below.

$$S1=\text{ceil}(\log 2(n))\times 2 \quad \text{[Formula 7]}$$

The number of bits K1 of the top piece of partial data is determined by means of Formula 8 below.

$$K1=P-S1 \quad \text{[Formula 8]}$$

The number of bits S2 that is required for the pieces of position information P2-Pn (partial data numbers) of the pieces of partial data C2-Cn other than the top piece of partial data is determined by means of Formula 9 below.

$$S2=\text{ceil}(\log 2(n)) \quad \text{[Formula 9]}$$

The number of bits K2 of the pieces of partial data C2-Cn other than the top piece of partial data is determined by means of Formula 10 below.

$$K2=P-S2 \quad \text{[Formula 10]}$$

Accordingly, the maximum embeddable number of bits M is determined by means of Formula 11 below.

$$M=K1+K2\times(n-1)=P\times n-\text{ceil}(\log 2(n))\times(n+1) \quad \text{[Formula 11]}$$

Assuming that n is 4 (n=4) and P is 100 bits (P=100), then S1 is 4 bit (S1=4 bit), K1 is 96 bit (K1=96 bit), S2 is 2 bit (S2=2 bit), K2 is 98 bit (K2=98 bit), and M is 390 bit (M=390 bit).

FIG. 7 is an operational flowchart of a data embedding process performed by the data embedding unit 102, in accordance with a first embodiment of the present invention.

Firstly, the data embedding unit 102 determines
(a) the number of divisions n
(b) the numbers of bits K1-Kn of the pieces of partial data C1-Cn, and
(c) the numbers of bits S1-Sn of the pieces of position information P1-Pn of the pieces of partial data C1-Cn,
on the basis of
the number of bits M of a piece of input data,
the number of bits P embeddable into the images, and
the configuration of the pieces of position information P1-Pn determined in advance (step 701 in the FIG. 7). The configuration of the pieces of partial data C1-Cn and position information P1-Pn are preliminarily selected from the above-mentioned three kinds of configuration examples in FIG. 4 through FIG. 6.

Next, the data embedding unit 102 divides the piece of input data into the n number of pieces of data by K1-Kn bits from the top, in order to generate the pieces of partial data C1-Cn (S702 in FIG. 7).

Next, the data embedding unit 102 sets a variable i, which represents the partial data number, to 1, i.e., the value that represents the top piece of partial data (S703 in FIG. 7). Hereinafter the i-th piece of partial data is referred to as a 'current piece.'

Next, embedding of current piece (i.e. generating of the i-th resultant image) will now be described with reference to S704 to S707 in FIG. 7. The data embedding unit 102 generates the position information Pi that is to specify the partial data number i and the number of divisions n (S704 in FIG. 7).

Next, the data embedding unit 102 embeds the partial data Ci and position information Pi into a duplicated image of the input image, generates an image Ei into which both the partial data Ci and the position information Pi are embedded, and stores the generated image Ei in the image storage unit 103 shown in FIG. 1 (S705 in FIG. 7).

Next, the data embedding unit 102 adds 1 to the partial data number i, and sets it to a value that represents the following piece of partial data (S706 in FIG. 7).

Then, the data embedding unit 102 finishes the embedding process by determining that embedding of all the pieces of partial data is completed when the partial data number i exceeds the number of divisions n (determination of S707 in FIG. 7 is "YES"), and returns the process to step S704 when the partial data number i is equal to or less than the number of divisions n (determination of S707 is "NO").

By the above processes performed by the data embedding unit 102, the piece of input data is embedded into the input image, and the images E1-En into which (a) the pieces of position information P1-Pn and (b) the pieces of partial data C1-Cn that are the pieces of input data divided into the n number of pieces of data are embedded are generated.

Figure 8:
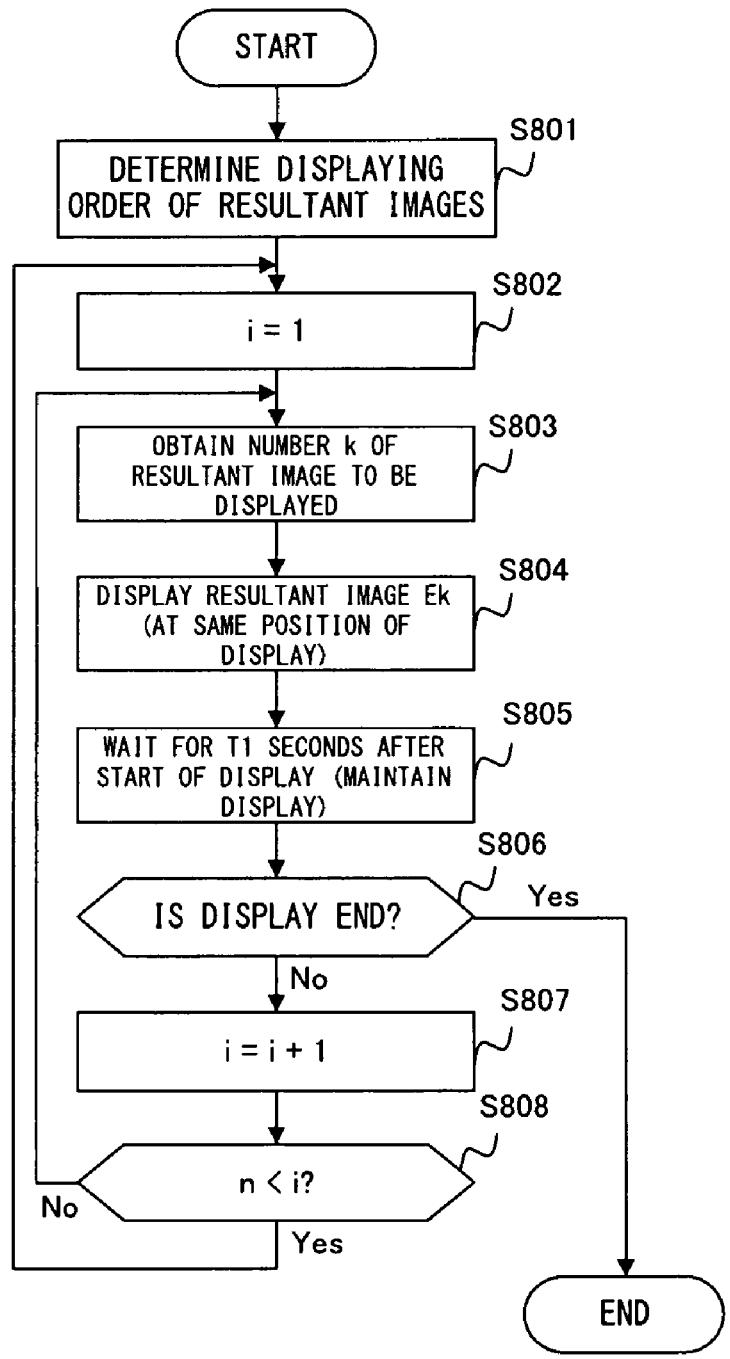
FIG. 8 is an operational flowchart of a displaying process of the images in which pieces of partial data are embedded in accordance with a first embodiment of the present invention.

FIG. 8 is an operational flowchart of a process of displaying the images into which the pieces of partial data are embedded; this process is performed by the display control unit 104 in accordance with the first embodiment of the present invention.

Firstly, the display control unit 104 determines the displaying order of the resultant images (S801 of FIG. 8). Although the display order may be the order of division, the order of minimum difference between the pixels or a random order may be chosen in order to improve the appearance.

Next, the display control unit 104 sets the variable i, which represents the number of the resultant images to be displayed, to 1 (S802 in FIG. 8).

Next, the display control unit 104 obtains a number k of the resultant image to be displayed on the basis of the displaying order (S803 in FIG. 8). The resultant image k corresponds to the piece of partial data Ck of the partial data number k.

Next, the display control unit 104 displays the k-th resultant image Ek on the display unit 105 of FIG. 1 (S804 in FIG. 8). When displaying the next resultant image, the display control unit 104 displays the image on the same position of a display.

Next, the display control unit 104 waits until T1 seconds pass after the resultant image Ek is displayed (S805 in FIG. 8). That is, the resultant image Ek is displayed for T1 seconds.

Next, the display control unit 104 finishes a displaying process when instructed externally to stop displaying (determination at S806 in FIG. 8 is "YES"), and lets the process proceed to S807 in FIG. 8 when not instructed to stop displaying (determination at S806 is "NO").

Subsequently, the display control unit 104 adds 1 to the variable i that represents the number of resultant images to be displayed (S807 in FIG. 8).

Next, the display unit 104 sets the process back to step S802 of FIG. 8 and displays the resultant images E1-En again when the variable i that represents the number of resultant images exceeds the number of divisions n (determination at S808 in FIG. 8 is "YES"). When the variable i is equal to or less than the number of divisions n (determination at S808 is "NO"), the display unit 104 sets the process back to step S803 and displays the following resultant image Ei.

By the processes performed by the display control unit 104, the resultant images E1-En are displayed in sequence at intervals of T1 seconds at the same position on a display.

Figure 9:
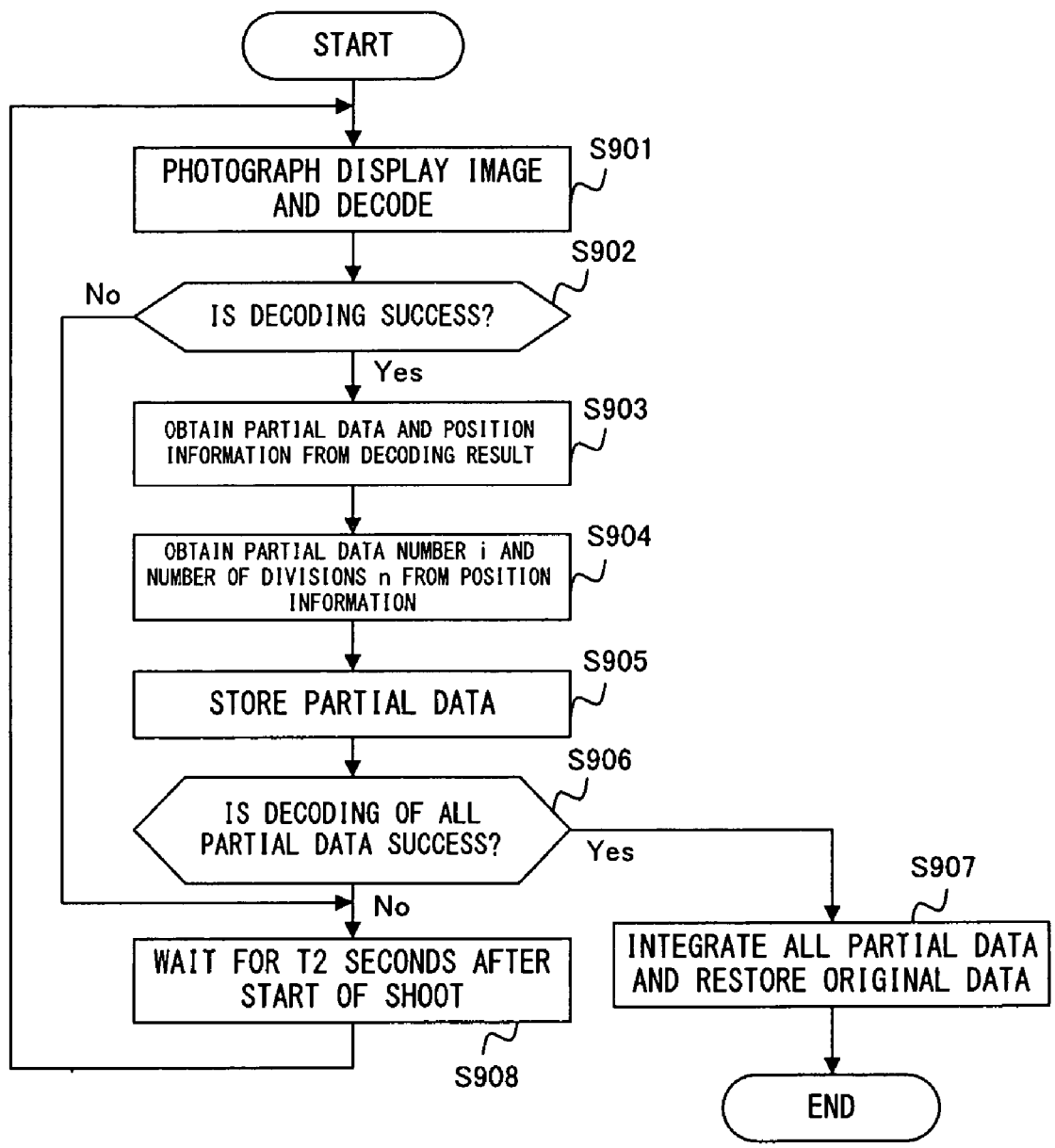
FIG. 9 is an operational flowchart of a photographing/recognizing process of resultant image in accordance with a first embodiment of the present invention.

FIG. 9 shows an operational flowchart of a photographing/recognizing process of the resultant images performed by the image input unit 106, the data extracting unit 107, and the data integrating unit 109 of FIG. 1, in accordance with the first embodiment of the present invention.

Firstly, the image input unit 106 of FIG. 1 photographs the resultant image displayed on a display of the display unit 105, and subsequently, the data extracting unit 107 of FIG. 1 performs a decoding process for extracting the embedded pieces of partial data and position information (S901 in FIG. 9).

Next, the data extracting unit 107 sets the process forward to step S903 of FIG. 9 when it succeeds in the decoding (determination at S902 is "YES"), and sets the process forward to step S908 of FIG. 9 when it fails in the decoding (determination at S902 is "NO").

The data extracting unit 107 obtains the pieces of partial data and position information as a result of the decoding when it succeeds in the decoding (S903 in FIG. 9).

Next, the data extracting unit 107 obtains the partial data number and the number of divisions n from the pieces of position information (in the case of the data configuration example of FIG. 5). In the case of a data configuration in which the number of divisions is fixedly determined in advance (in the case of FIG. 4), the number of divisions is not included in the pieces of position information. When a method is adapted in which the number of divisions is given only to the top piece of partial data (the data configuration example shown in FIG. 6), the number of divisions n is obtained only when the partial data number is 1, i.e., when it is the top piece of partial data (S904 in FIG. 9, referring to the whole paragraph).

Next, the data extracting unit 107 stores the decoded pieces of partial data in the data storage unit 108 of FIG. 1 together with the partial data number in order to maintain the decoded partial data. The number of divisions is also maintained when the number of divisions is included in the pieces of position information (S905 in FIG. 9, referring to the whole paragraph).

Next, the data extracting unit 107 confirms whether or not the decoding of all pieces of partial data is successfully completed, on the basis of the number of divisions n (S906 in FIG. 9). The data extracting unit 107 sets the process forward to step S907 of FIG. 9 when all the pieces of partial data are successfully obtained (determination at S906 is "YES"), and sets the process forward to step S908 of FIG. 9 when there is an outstanding piece of partial data that has not yet been obtained (determination at S906 is "NO").

When the data extracting unit 107 succeeds in obtaining all the pieces of partial data, the data integrating unit 109 of FIG. 1 integrates the obtained pieces of decoded partial data into the original pieces of data in order of the partial data number obtained together with those pieces of partial data, and completes the process (S907 in FIG. 9).

When there is an outstanding piece of partial data that has not yet been obtained, the data extracting unit 107 waits for T2 seconds after photographing has been started (S908 in FIG. 9). As shown in FIG. 10, photographing/recognizing intervals T2 are set to be short relative to display times T1 to ensure that the displayed resultant images are photographed without any failures and that the decoding will be completed in as short time as possible. Once the elapsed time reaches T2 seconds, the data extracting unit 107 sets the process back to step 901 of FIG. 9, and repeats the photographing and decoding processes until the all pieces of partial data are obtained.

By the above processes performed by the image input unit 106, data extracting unit 107, and data integrating unit 109, the resultant images E1-En into which the pieces of partial data displayed on a screen are embedded are photographed and decoded to extract the embedded pieces of partial data, the extracted pieces of partial data are integrated, and then the original piece of data can be obtained.

Second Embodiment of the Present Invention

A second embodiment of the present invention will now be described with reference to FIGS. 11A-17.

While the data to be embedded is simply divided to produce resultant images in the first embodiment of the present invention, in the second embodiment of the present invention, the pieces of divided data are generated by performing some sort of reversible operation.

FIG. 11A-FIG. 13 are explanatory diagrams of a method in which pieces of divided data (pieces of partial data) are rotated and embedded.

Redundantly embedding pieces of data for which an identical piece of divided data is rotated generates resultant images whose embedded states are different from each other. In the first embodiment of the present invention, a certain piece of partial data is embedded into only one certain image. For example, the partial data Ci is embedded only into the resultant image Ei. For this reason, when any one of the resultant images E1-En cannot be decoded, the original piece of data cannot be obtained.

By contrast, in the second embodiment of the present invention, a certain piece of divided data is rotated by various numbers of bits, and each of the pieces of divided data is distributed into a number of images so that they are redundantly embedded as well as displayed. Accordingly, this will be successful as long as one of those images is decoded, and thus the probability of succeeding in decoding can be improved.

Figure 11A:
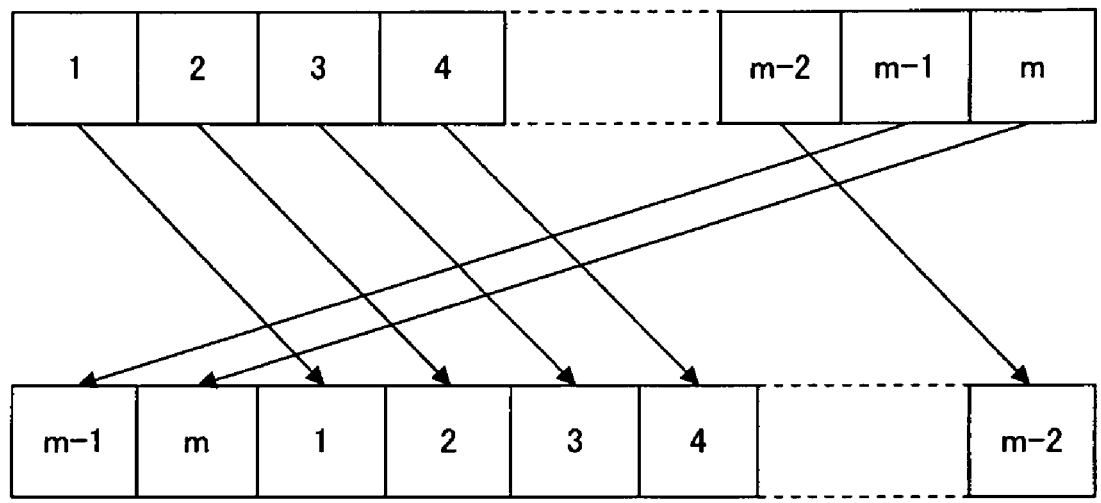
FIGS. 11A and 11B are an explanatory diagram and a data configuration diagram of a data embedding method in which bit rotation is performed on pieces of divided data in accordance with a second embodiment of the present invention.
Figure 11B:
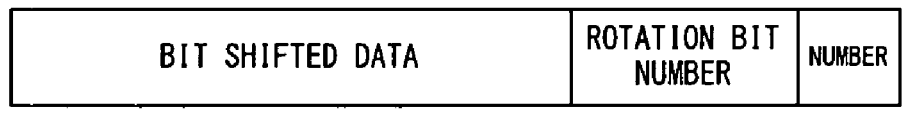

FIG. 11A shows an alignment order of the pieces of data in which 2-bit rotation is performed on the pieces of divided data in accordance with the second embodiment of the present invention. FIG. 11B shows a data configuration example of this case.

In this data configuration, the data embedding unit 102 of FIG. 1 performs embedding in such a way that the rotated bit number is included in the pieces of position information. By contrast, the data extraction unit 107 of FIG. 1 rotates the pieces of data in an opposite direction by the bit rotation number at the time of decoding, and thus obtains the pre-rotated original piece of divided data.

Figure 12:
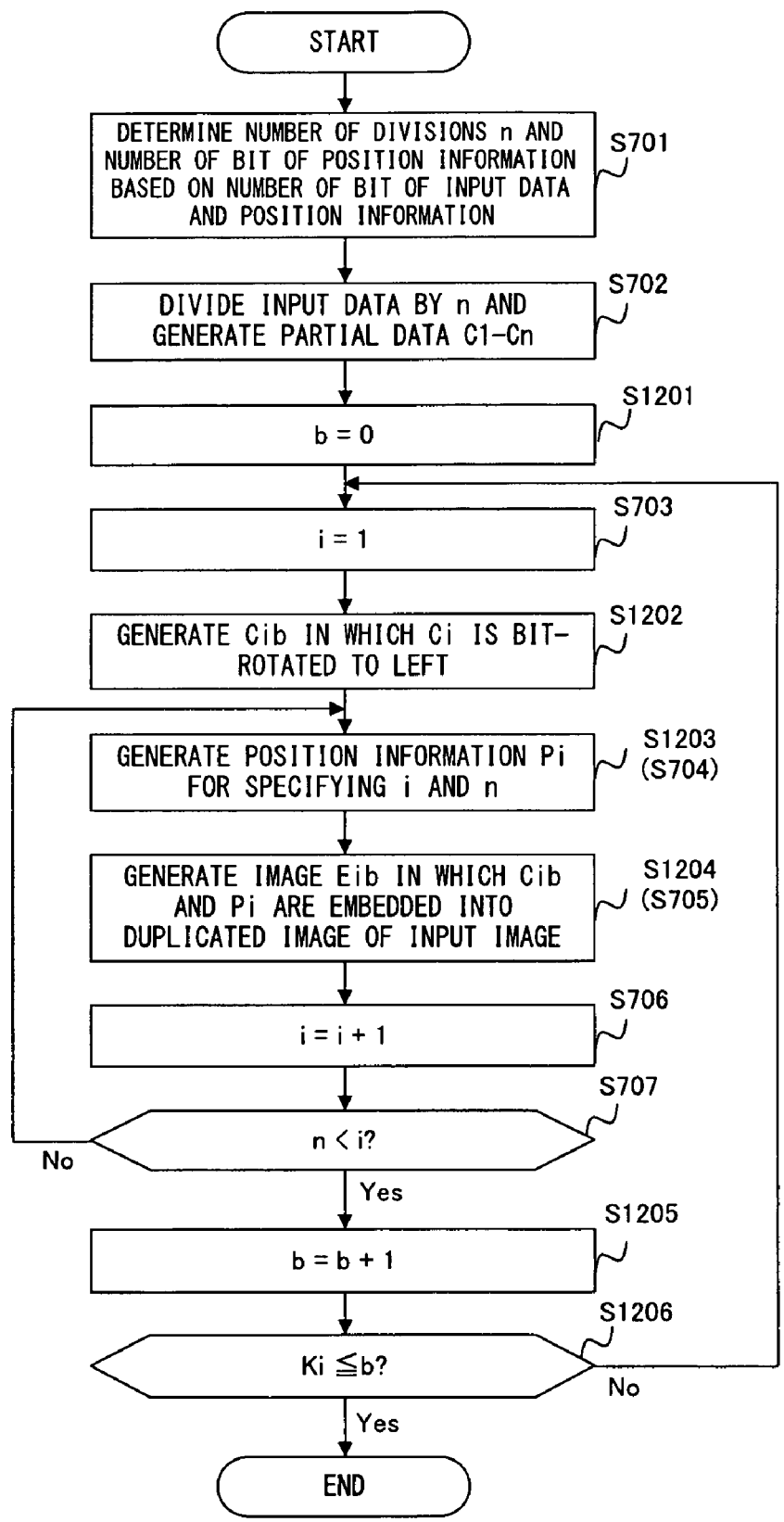
FIG. 12 is an operational flowchart (1) of a data embedding process in accordance with a second embodiment of the present invention.

FIG. 12 is an operational flowchart of a data embedding process that is performed by the data embedding unit 102 of FIG. 1 under the data configuration of FIG. 11A in accordance with the second embodiment of the present invention.

In FIG. 12, steps to which like numerals to those in the operational flowchart of FIG. 7 are given are the steps that perform the same processes as FIG. 7. Also, steps in which step numerals of FIG. 7 are in parentheses perform processes having similar purposes to those in FIG. 7.

In FIG. 12, a variable b represents the number of bets on which bit rotation is performed. The equation "b=0" means that rotation is not to be performed. Firstly, it is determined that the variable b is 0 (b=0) at step S1201, and an resultant image is generated that is not to be rotated. Subsequently, as the variable b is counted up (S1205→S1206→S703), the image on which b bit rotation is performed is generated (S1202-S1204). An upper limit of the number of bits to be rotated is the number of bits of pieces of divided data (the number of bits of i-th piece of divided data is Ki bits) (S1206). This is because rotation further than the above will produce the same data.

Figure 13:
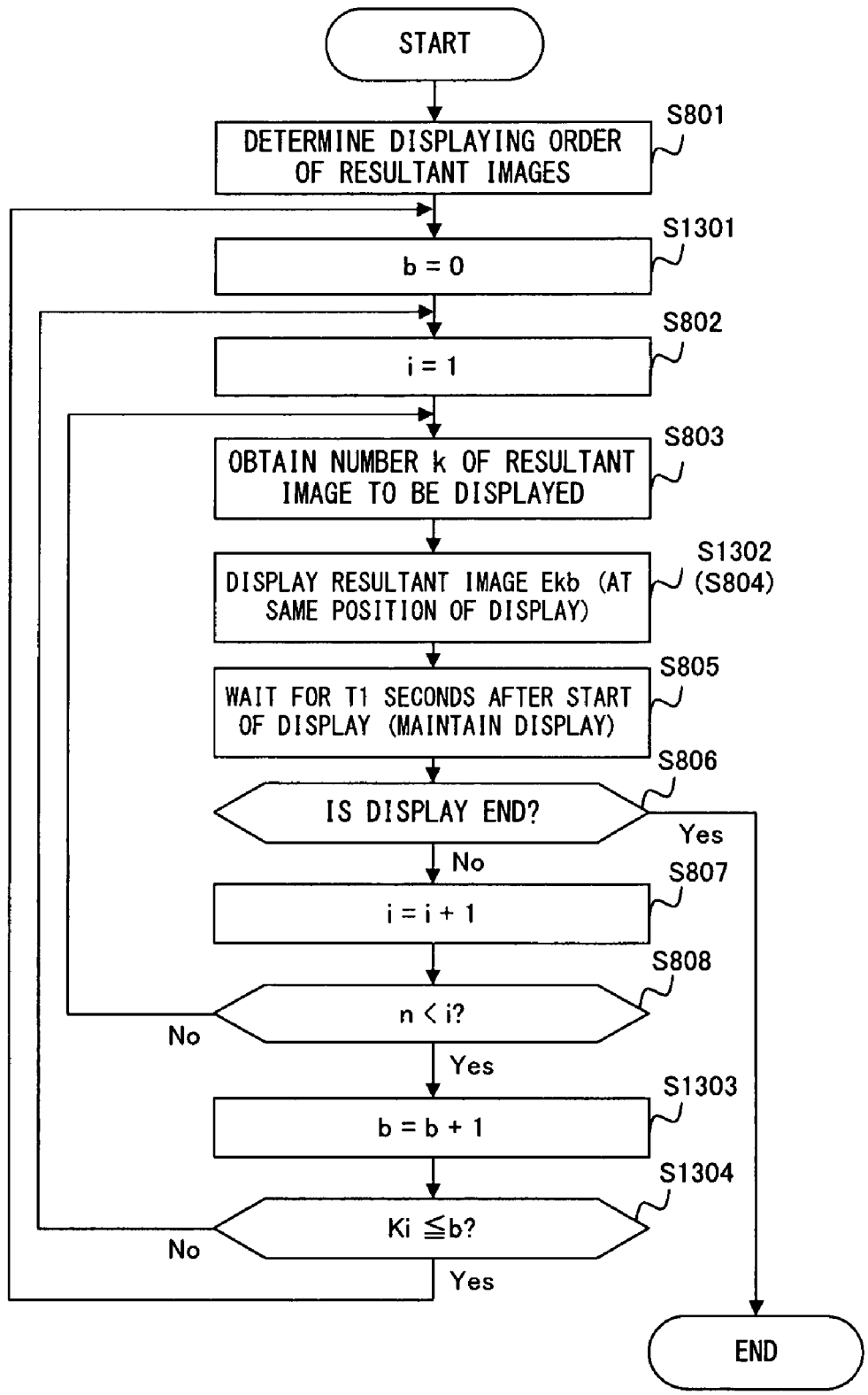
FIG. 13 is an operational flowchart (1) of a displaying process of the images in which pieces of partial data are embedded in accordance with a second embodiment of the present invention.

FIG. 13 is an operational flowchart of a displaying process of the images in which the pieces of partial data are embedded; this process is performed by the display control unit 104 of FIG. 1 under the data configuration of FIG. 11A, in accordance with the second embodiment of the present invention.

In FIG. 13, steps to which like numerals to those in operational flowchart of FIG. 8 in the first embodiment of the present invention are given are the steps that perform the same processes as FIG. 8. Also, steps in which step numerals are in parentheses perform processes having similar purposes as in FIG. 8.

In FIG. 13, firstly, it is determined that the variable b is 0 (b=0) at a step S1301, and subsequently, as the variable b is counted up (S1303→S1304→S802), the image on which b bit rotation is performed is displayed in the same way as FIG. 8 (S1302). When the variable b reaches an upper limit (determination at S1304 is "YES"), it is again determined that b is 0 (b=0), and a similar display is repeated (S1304→S1301).

FIGS. 14A through 16 are explanatory diagrams of a method in which the bit order of the divided pieces of data is rotated from side to side and embedded.

In this method, the piece of data in which the same piece of divided data is rotated from side to side is distributed into two images so that they are redundantly embedded and displayed. Accordingly, this method is successful as long as one of those two images is decoded, and thus the probability of succeeding in decoding can be improved.

FIG. 14A shows an alignment order in which pieces of divided data are rotated from side to side in accordance with the second embodiment of the present invention. FIG. 14B shows a data configuration example of that case.

In this data configuration, the data embedding unit 102 of FIG. 1 performs embedding that includes, in the pieces of position information, a 1-bit rotation flag that is for distinguishing whether or not the bit is rotated from side to side. By contrast, the data extraction unit 107 of FIG. 1 checks the rotation flag at the time of decoding. The data extracting unit 107 determines that the bit is not rotated from side to side when the rotation flag is "0", and determines that the bit is rotated from side to side when the rotation flag is "1". The data extracting unit 107 obtains the original pieces of divided data by rotating the bit from side to side accordingly.

FIG. 15 is an operational flowchart of a data embedding process performed by the data embedding unit 102 of FIG. 1 under the data configuration of FIG. 14A in accordance with the second embodiment of the present invention.

In FIG. 15, steps to which like numerals to those in the operational flowchart of FIG. 7 are given are the steps that perform the same processes as FIG. 7. Also, steps in which step numerals of FIG. 7 are in parentheses perform processes having similar purposes to those in FIG. 7.

In FIG. 15, firstly, a data embedding process without bit rotation is performed in the same way as FIG. 7 (see S1501). Subsequently, bit rotation is performed (S1502), and then a data embedding process including bit rotation is performed in the same way as FIG. 7 (see S1503, S1504). In the pieces of divided data, $C_i$ is a non-bit-rotated piece of data, and $C'_i$ is a bit rotated piece of data. Also for the pieces of position information, $P_i$ is a non-bit-rotated piece of data, and $P'_i$ is a bit-rotated piece of data. Further, for the resultant images, $E_i$ is a non-bit-rotated image, and $E'_i$ is a bit-rotated image.

Figure 16:
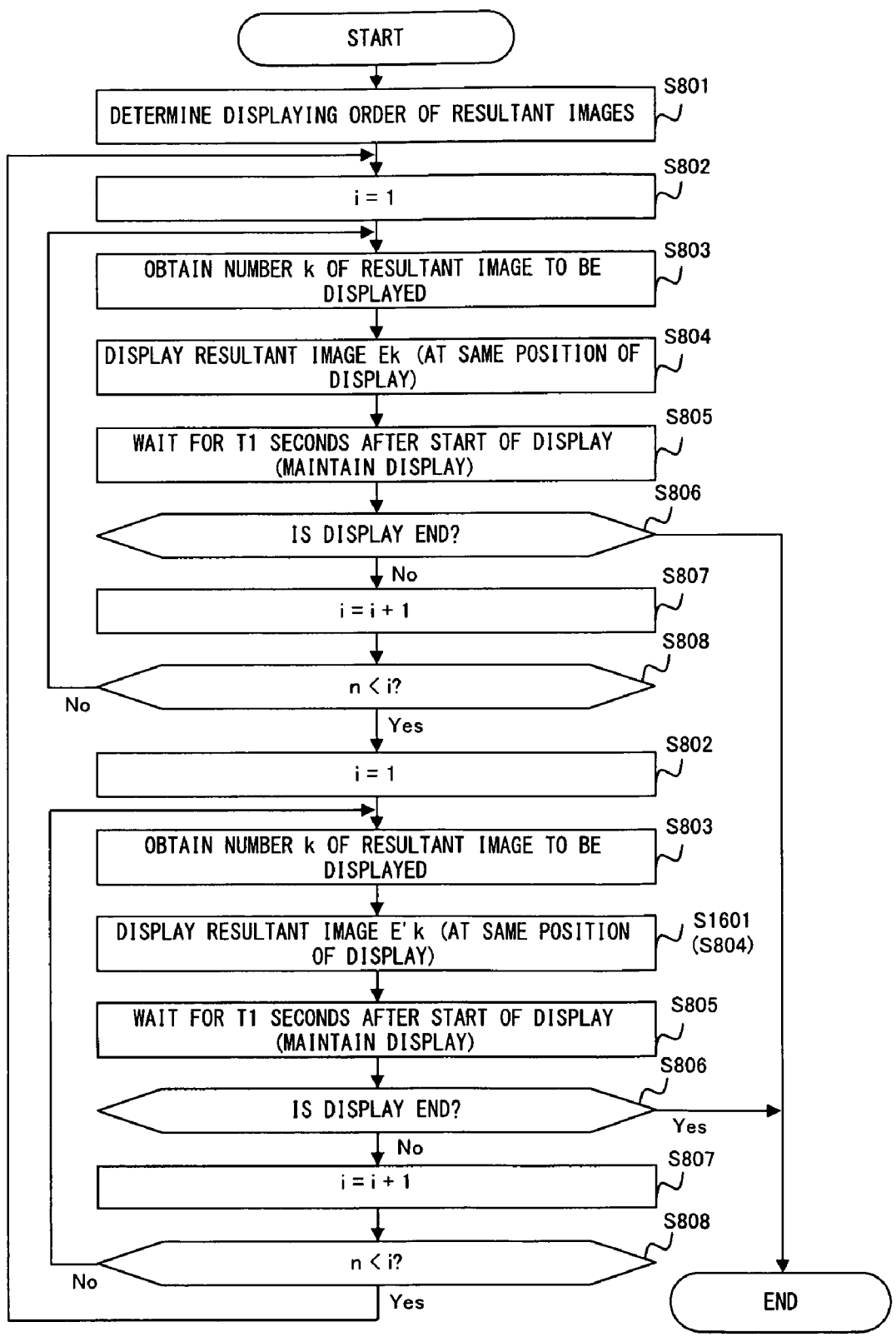
FIG. 16 is an operational flowchart (2) of a displaying process of the images in which pieces of partial data are embedded in accordance with a second embodiment of the present invention.

FIG. 16 is an operational flowchart of a displaying process of the images in which the pieces of partial data are embedded, the embedding being performed by the display control unit 104 of FIG. 1 under the data configuration of FIG. 14A, in accordance with a second embodiment of the present invention.

In FIG. 16, steps to which like numerals to those in the operational flowchart of FIG. 8 in the first embodiment of the present invention are given are the steps that perform the same processes as FIG. 8. Also, steps in which step numerals are in parentheses perform processes having similar purposes to those in FIG. 8.

In FIG. 16, a displaying process of the non-bit-rotated resultant image $E_k$ is performed in the same way as FIG. 8, and subsequently a displaying process of the bit rotated resultant image $E'_k$ is performed in the same way as FIG. 8 (see S1601).

Instead of bit rotation from side to side as shown in FIG. 14A, a method of rotating each bit value between 0 and 1 may also be applied.

FIGS. 17A and 17B are an explanatory diagram of other dividing methods of the pieces of divided data in accordance with a second embodiment of the present invention.

FIG. 17A is an example in which the pieces of divided data are obtained by sequentially extracting pieces of data in units of 1 bit, and FIG. 17B is an example in which the order of extracting the pieces of data is changed to a predetermined order. As the pieces of divided data cannot be restored to the piece of pre-divided original data unless the order is known in the example of FIG. 17B, the example of FIG. 17B can be applied to uses in which the concealment of data needs to be increased.

Third Embodiment of the Present Invention

A third embodiment of the present invention will now be described with reference to FIG. 18 and FIG. 19.

The third embodiment of the present invention enables embedding data into a moving image.

Figure 18:
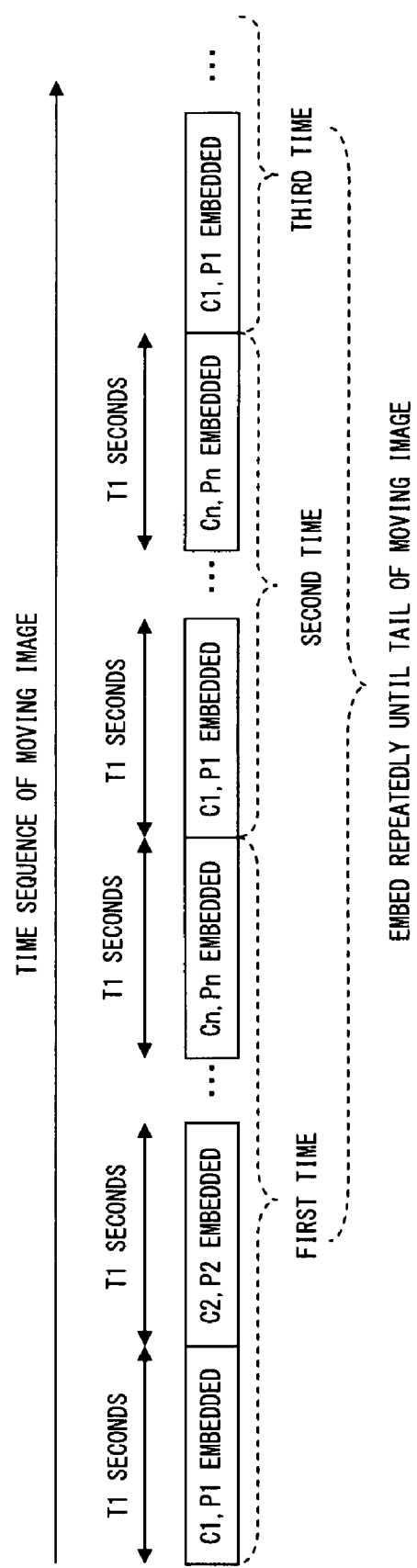
FIG. 18 is a principle explanatory diagram of an application example of embedding data into a moving image in accordance with a third embodiment of the present invention.

FIG. 18 is a principle explanatory diagram of embedding data into a moving image.

FIG. 19 is an operational flowchart of a data embedding process in accordance with the third embodiment of the present invention; the embedding process is performed by the data embedding unit 102 of FIG. 1.

In FIG. 19, steps to which like numerals to those in the operational flowchart of FIG. 7 are given are the steps that perform the same processes as FIG. 7. Also, steps in which step numerals of FIG. 7 are in parentheses perform processes having similar purposes to those in FIG. 7.

In the third embodiment of the present invention, a moving image is divided into frame images in units of Ti seconds, and pieces of divided data are sequentially embedded for each T1 second (see S1902→S706→S707→704 of FIG. 18 and FIG. 19). The same divided data is embedded into a frame image within T1 seconds (see S1901 of FIG. 18 and FIG. 19). The piece of divided data is repeatedly embedded until the tail of the moving image is reached (S707→S703→S1902→End in FIG. 19).

As a moving image in which embedding is performed as described above is reproduced, the moving image can be decoded in the same way as a still image. That is, the same process of decoding can be applied to both without discriminating between a still image and a moving image in the decoding.

Embodiment in Which the Present Invention is Implemented as a Program

FIG. 20 shows a hardware configuration example of a computer or terminal device etc. capable of implementing a system that corresponds to the above-mentioned first through third embodiments of the present invention.

A computer shown in FIG. 20 includes a CPU 2001, a memory 2002, an input device 2003, an output device 2004, an external storage device 2005, a portable storage medium driving device 2006 into which a transportable storage medium 2009 is inserted, and a network connection device 2007, and includes a configuration in which they are connected to each other via a bus 2008. The configuration shown in FIG. 20 is merely an example of a computer capable of implementing the above system, and such a computer is not limited to this configuration.

The CPU 2001 controls the entirety of this computer. The memory 2002 is a memory such as RAM which temporarily stores a program stored in the external storage device 2005 (or transportable storage medium 2009) at the time of executing a program or updating data. The CPU 2001 controls the entirety of the computer by reading out the program to the memory 2002 and executing it.

The input device 2003 is comprised of a keyboard, a mouse, etc. and their interface control devices. The input device 2003 detects an input from the keyboard, mouse, etc. operated by a user, and notifies the CPU 2001 of that detection result.

The output device 2004 is comprised of a display device, print device etc. and their interface control devices. The output device 2004 outputs the data transmitted by the control of the CPU 2001 to the display device or the print device.

The external storage device 2005 is, for example, a hard disk storage device. It is used mainly for storing various kinds of data or programs.

The portable storage medium driving device 2006 houses a transportable storage medium 2009 such as an optical disk, a SDRAM, or a compact flash, and plays an auxiliary role to the external storage device 2005.

The network connection device 2007 is, for example, a device for connecting a communication line such as a mobile communication network, a LAN (Local Area Network), or a WAN (Wide Area Network).

The system according to the present embodiment is implemented with the program, having functions implemented in the functional block of FIG. 1, that is executed in the CPU 2001. The program may be stored in, for example, the external storage device 2005 or the transportable storage medium 2009, and be distributed. Alternatively, it may be configured in such a way that the network connection device 2007 obtains it from a network.

In particular, the portion comprised of the image input unit 106, the data extracting unit 107, the data storage unit 108, and data integrating unit 109 is implemented as a function of, for example, a mobile phone or a terminal device of a mobile.

What is claimed is:

1. A data embedding method to embed data into an image comprising:
   dividing, by a predetermined length, subject data to be embedded into a plurality of pieces of partial data; and
   embedding, using a processor, to generate resultant images by
      a first embedding which embeds a first position information specifying divided positions of a first partial data, a first bit sequence obtained by rotating the first partial data in a certain direction by a first number of bits, and the first number of bits into a first input image,
      a second embedding which embeds a second position information specifying divided positions of a second partial data, a second bit sequence obtained by rotating the second partial data in the certain direction by the first number of bits, and the first number of bits into a second input image, and
      a third embedding which embeds the second position information, a third bit sequence obtained by rotating the second partial data in the certain direction by a second number of bits, and the second number of bits into a third input image.

2. A data recognition method used to extract a plurality of pieces of partial data from a display image and restore a subject image to be embedded, the display image displayed by a method to display resultant images in which a subject data is embedded as a plurality of pieces of partial data by the data embedding method according to claim 1 and to sequentially display the resultant images on a display device in a predetermined order and at predetermined display time intervals, the data recognition method comprising:
   photographing the display image at predetermined photographing time intervals;
   extracting, using a processor, the pieces of embedded partial data and position information from photographed images; and
   integrating the pieces of partial data extracted based on the pieces of extracted position information to restore the subject data to be embedded, after repeatedly performing the photographing and the extracting until the pieces of partial data and position information are all obtained while identifying the pieces of extracted position information,
   wherein the extracting extracts the first bit sequence from a first photographed image obtained by photographing the first input image after the first embedding,
   the integrating obtains the first partial data by rotating the first bit sequence in an opposite direction from the certain direction by the first number of bits,
   when the extracting fails to extract the second bit sequence from a second photographed image obtained by photographing the second input image after the second embedding, the extracting extracts the third bit sequence from a third photographed image obtained by photographing the third input image after the third embedding, and
   the integrating obtains the second partial data by rotating the third bit sequence in the opposite direction by the second number of bits.

3. The data recognition method according to claim 2, wherein
   the position information include at least information relating to an integrating order of the plurality of pieces of partial data,
   the integrating determines, by identifying the integrating order indicated by the position information, that extraction of all the pieces of partial data is completed when a predetermined number of the plurality of pieces of partial data of a different integrating order are extracted, and
   the integrating integrates the plurality of pieces of partial data based on the integrating order.

4. The data recognition method according to claim 2, wherein the position information include at least information relating to a number of divisions of the subject data to be embedded and an integrating order of the plurality of pieces of partial data, the integrating determines, by identifying the number of divisions and the integrating order indicated by the position information, that extraction of all the pieces of partial data is completed when the pieces of partial data of a different integrating order equal in number to the number of divisions are extracted, and the integrating integrates the plurality of pieces of partial data based on the integrating order.

5. The data recognition method according to claim 2, wherein the position information include at least information relating to an integrating order of the plurality of pieces of partial data, and a position information of a partial data that is at atop of the integrating order includes an information relating to a number of divisions of the plurality of pieces of partial data, the integrating determines, by identifying the number of divisions and an integrating order indicated by the pieces of position information, that extraction of all the pieces of partial data is completed when the plurality of pieces of partial data of a different integrating order equal in number to the number of divisions are extracted, and the integrating integrates the plurality of pieces of partial data based on the integrating order.

6. The data embedding method according to claim 1, wherein the dividing cuts the subject data to be embedded by the predetermined length, and outputs a plurality of cut data as the plurality of pieces of partial data.

7. The data embedding method according to claim 1, wherein the dividing cuts the subject data to be embedded by the predetermined length, performs a predetermined reversible data converting operation for a plurality of pieces of the cut data, and outputs a resulting plurality of pieces of converted data as the plurality of pieces of partial data.

8. The data embedding method according to claim 6, wherein the dividing generates the plurality of pieces of partial data so that an identical portion of a plurality of the cut data is redundantly included in the plurality of pieces of partial data.

9. The data embedding method according to claim 1, wherein the plurality of input images are identical, obtained by duplicating one still input image.

10. The data embedding method according to claim 1, wherein the plurality of input images are a plurality of frame images composing an input moving image.

11. The data recognition method according to claim 2, wherein the photographing time interval is shorter than the display time interval.

12. A data embedding device performing a data embedding operation by the data embedding method according to claim 1.

13. A data recognition device performing a data recognition operation by the data recognition method according to claim 2.

14. A non-transitory recording medium storing a program, the program causing a computer to execute a process to embed data into an image, the process comprising:

dividing, by a predetermined length, subject data to be embedded into a plurality of pieces of partial data; and to generate resultant images by
a first embedding which embeds a first position information specifying divided positions of a first partial data, a first bit sequence obtained by rotating the first partial data in a certain direction by a first number of bits, and the first number of bits into a first input image, a second embedding which embeds a second position information specifying divided positions of a second partial data, a second bit sequence obtained by rotating the second partial data in the certain direction by the first number of bits, and the first number of bits into a second input image, and a third embedding which embeds the second position information, a third bit sequence obtained by rotating the second partial data in the certain direction by a second number of bits, and the second number of bits into a third input image.

15. A non-transitory recording medium storing a program, the program causing a computer to perform a process to extract a plurality of pieces of partial data from a display image and restore subject data to be embedded, the process comprising:

photographing the display image at predetermined photographing time intervals;

extracting, the pieces of embedded partial data and position information from the photographed images; and integrating the pieces of partial data extracted based on the pieces of extracted position information to restore the subject data to be embedded, after repeatedly performing the photographing and the extracting until the pieces of partial data and position information are all obtained while identifying the pieces of extracted position information, wherein the extracting extracts the first bit sequence from a first photographed image obtained by photographing the first input image after the first embedding, the integrating obtains the first partial data by rotating the first bit sequence in an opposite direction from the certain direction by the first number of bits, when the extracting fails to extract the second bit sequence from a second photographed image obtained by photographing the second input image after the second embedding, the extracting extracts the third bit sequence from a third photographed image obtained by photographing the third input image after the third embedding, and the integrating obtains the second partial data by rotating the third bit sequence in the opposite direction by the second number of bits.

* * * * *

UNITED STATES PATENT AND TRADEMARK OFFICE
CERTIFICATE OF CORRECTION

PATENT NO. : 8,363,885 B2
APPLICATION NO. : 12/367221
DATED : January 29, 2013
INVENTOR(S) : Sakai et al.

Page 1 of 1

It is certified that error appears in the above-identified patent and that said Letters Patent is hereby corrected as shown below:

In the Claims:

Column 15, Line 18, In Claim 5, delete "atop" and insert -- a top --, therefor.
Column 16, Line 9, In Claim 14, delete "to" and insert -- embedding to --, therefor.

Signed and Sealed this
Seventh Day of May, 2013

Teresa Stanek Rea
*Acting Director of the United States Patent and Trademark Office*